United States Patent [19]

Regan

[11] Patent Number: 4,706,497

[45] Date of Patent: Nov. 17, 1987

[54] LIQUID DETECTION CIRCUIT

[75] Inventor: Thomas O. Regan, North Aurora, Ill.

[73] Assignee: The United States of America as represented by the United States Department of Energy, Washington, D.C.

[21] Appl. No.: 846,783

[22] Filed: Apr. 1, 1986

[51] Int. Cl.⁴ ............................................. G01F 23/24
[52] U.S. Cl. ..................................... 73/295; 340/622; 361/178; 62/49
[58] Field of Search .............. 73/295; 340/622; 62/49; 184/6.4; 307/118, 562, 565; 361/178; 137/392

[56] References Cited

U.S. PATENT DOCUMENTS

| | | | |
|---|---|---|---|
| 3,283,576 | 11/1966 | Halpin et al. | 73/295 |
| 3,740,740 | 6/1973 | Milo | 73/295 |
| 3,876,037 | 4/1975 | Rath, Jr. | 73/295 |
| 3,943,767 | 3/1976 | Efferson | 73/295 |
| 4,103,319 | 7/1978 | Crain et al. | 361/178 |
| 4,163,391 | 8/1979 | Beard et al. | 73/295 |
| 4,319,233 | 3/1982 | Matsuoka et al. | 73/295 |
| 4,326,199 | 4/1982 | Tarpley et al. | 73/295 |
| 4,404,809 | 9/1983 | Johnson et al. | 73/295 |
| 4,550,261 | 10/1985 | Hormel et al. | 361/178 |
| 4,600,844 | 7/1986 | Atkins | 307/118 |

FOREIGN PATENT DOCUMENTS 0056716  4/1982  Japan ..................................... 73/295

OTHER PUBLICATIONS

Vanderkooy J. et al, "Semiautomatic Liquid Helium Transfer Control," Rev. Sci. Instrum., 49(12) Dec. 1978, pp. 1746–1747.

Pal. A. K. et al, "A Liquid Nitrogen Two Level Controller of New Design Cryogenics, vol. 20, No. 2, Feb. 1980, pp. 108–109.

Primary Examiner—Charles Frankfort
Assistant Examiner—Thomas B. Will
Attorney, Agent, or Firm—Gustavo Siller, Jr.; Paul A. Gottlieb; Judson P. Hightower

[57] ABSTRACT

Herein is a circuit which is capable of detecting the presence of liquids, especially cryogenic liquids, and whose sensor will not overheat in a vacuum. The circuit parameters, however, can be adjusted to work with any liquid over a wide range of temperatures.

8 Claims, 2 Drawing Figures

LIQUID DETECTION CIRCUIT

CONTRACTUAL ORIGIN OF THE INVENTION

The United States Government has rights in this invention pursuant to Contract No. DE-AC02-76CH03000 between the U. S. Department of Energy and Universities Research Association, Inc.

BACKGROUND OF THE INVENTION

This invention relates to electronic liquid detection circuits. Specifically, this invention relates to circuits for detecting the presence of a cryogenic liquid in a closed vessel. Fluid detection circuits generally sense the presence of a liquid by measuring either the electrical conductivity or the temperature of a liquid as an indicator of its presence. Sonic transducers have also been developed that measure the distance between a transducer and the surface of the fluid in a vessel, by measuring the time it takes a sound wave to travel to the fluid surface. In detecting the presence of a cryogenic liquid, commonly used with superconductors for example, the physical components used to sense the liquid must be able to operate at extremely low temperatures, near absolute zero. Since most liquified gases are nonconductive, a cryogenic liquid detector relying on electrical conductivity would be ineffective. Ultrasonic methods are not suitable because the holding vessels or cryostats used to store liquid gases, operate at widely varying pressures.

Existing fluid detectors for cryogenic liquids usually employ a method for sensing the temerature of the liquid as an indicator of its presence. A temperature sensitive resistance, such as a thermistor, that changes resistance proportionately with temperature, produces a detectable voltage change in response to a cold fluid surrounding or contacting it. Existing circuits using a temperature sensitive resistance such as a thermistor to detect a fluid, suffer on serious drawback: the inability to protect the sensing resistor from overheating when it's operated in a vacuum. Power must be removed from the sensing element before evacuating the vessel to protect the sensor from damage.

Cryostats, the vessels that hold cryogenic liquids, are frequency emptied and evacuated to purify the container prior to filling. In application where the liquid level in a vessel is automatically maintained, if a liquid detector used to automatically maintain the fluid level uses a temperature sensitive resistance that is carrying current is inadvertently destroyed by overheating, there may be no way of knowing of the failure of the sensing element before liquid is lost or before substantial damage to the vessel occurs from underfilling or overfilling. A self-protected liquid detector, one wherein the sense element is protected from overheating would have an obvious advantage over unprotected circuits, namely reliable operation despite operator negligence.

. It is therefore an object of the present invention to detect the presence of a liquid in a vessel.

Another object is to detect the presence of very low temperature liquids.

Another objective is to provide over-temperature protection for a temperature sensitive resistance used to measure the temperature of a liquid in an evacuated container.

SUMMARY OF THE INVENTION

To achieve the foregoing objects of the invention there is provided a circuit that produces as an output, a two-valued d.c. voltage that changes in response to the temperature change of a temperature dependent resistance. The output is active or inactive, or true or false, according to the absence or presence of a liquid with respect to the sensing element.

When the sensing element is operated in a vacuum or without liquid contacting and cooling it, the circuit will limit the power dissipation of the element preventing over heating of the element. By selecting appropriate component values, the circuit can be adapted to sense the presence of virtually any liquid, subject only to the limitations of available components.

DETAILED DESCRIPTION

Figure 1:
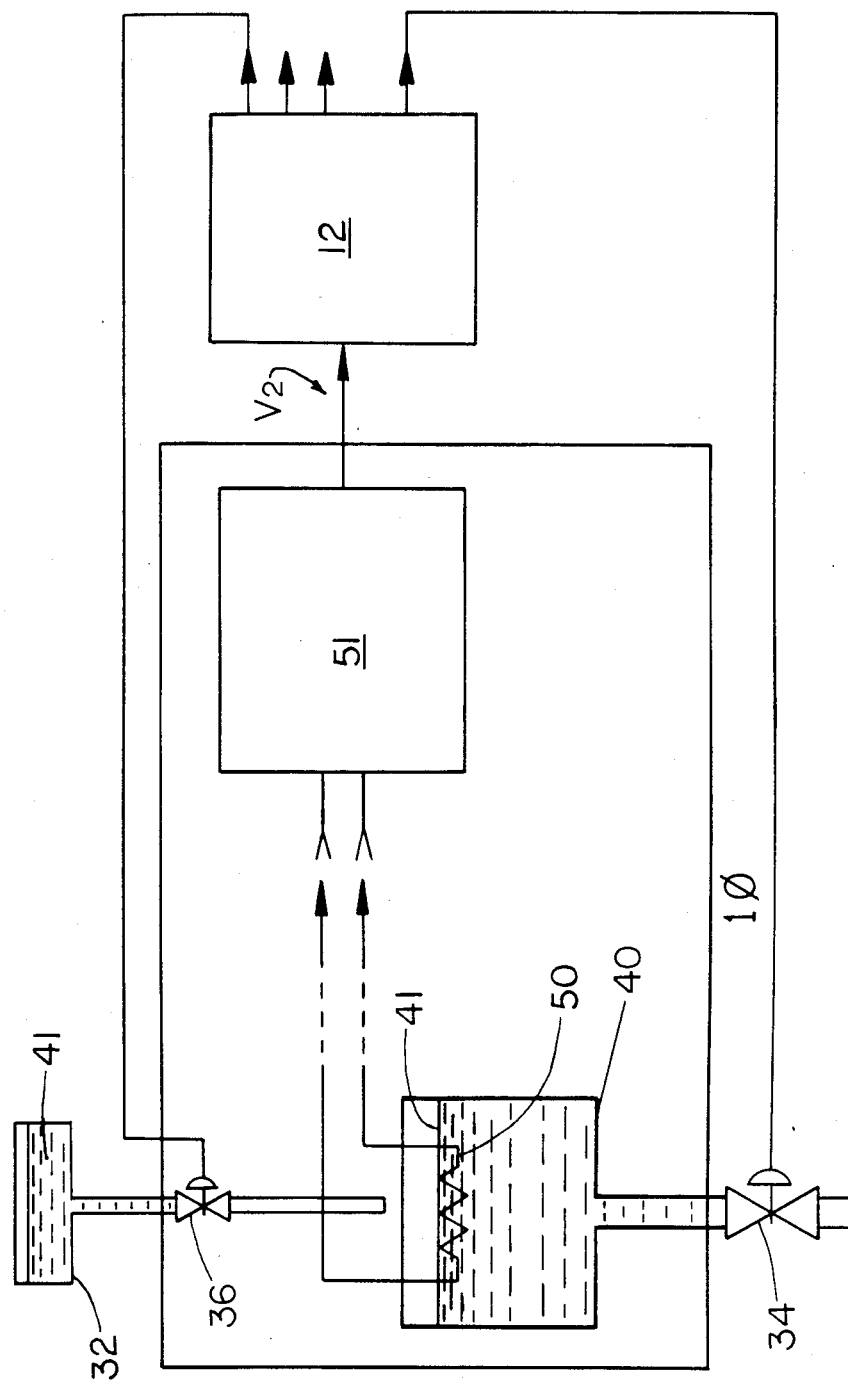
FIG. 1 is a block diagram showing the relationship between the temperature sensitive resistance and the liquid detection circuit.

Referring to FIG. 1 there is shown a block diagram of a liquid level controller system used to maintain the level of the liquid $-41$ in cryostat 40. Thermistor 50 would be mounted in cryostat 40 at the desired liquid level. Fluid detection circuit 51 monitors the resistance of thermistor 50, and produces an output signal, denoted in FIG. 1 as $V_2$. Block 12 in FIG. 1, the monitoring circuits, are shown controlling input valve 36 and output valve 34 in response to the condition of $V_2$. These monitoring circuits might include, for example, comparator circuits used to detect the state of $V_2$ and activate the appropriate valves. There might also be alarm circuits in block 12 to detect invalid conditions of $V_2$. The circuits of block 12 will of necessity be application specific, changing to suit the needs of the desired system. In operation, when liquid in cryostat 40 drops below thermistor 50, fluid detector circuit 51 output, $V_2$ changes state. Monitoring circuits 12 might open valve 36 allowing more cryogenic liquid $-41$ to enter cryostat 40 from liquid supply 32. Alternatively, monitoring circuits 12 might also open drain valve 34 when the liquid level of cryostat 40 goes too high, as detected by another sensor, not shown. In the system shown in FIG. 1, thermistor 50 is electrically connected to the fluid detection circuit 51 but physically in cryostat 40. Cryostat 40 could be located at any distance, limited only by a predetermined upper limit of the electrical resistance of the connection means between thermistor 50 and detection circuit 51.

If the fluid being monitored in cryostat 40 in a given system is conductive, exposed metal connections to thermistor 50 would require appropriate electrical insulation to limit current flow through only the thermistor. In applications where the liquid being monitored is turbulent in the holding vessel, a baffle surrounding the thermistor might be required.

Figure 2:
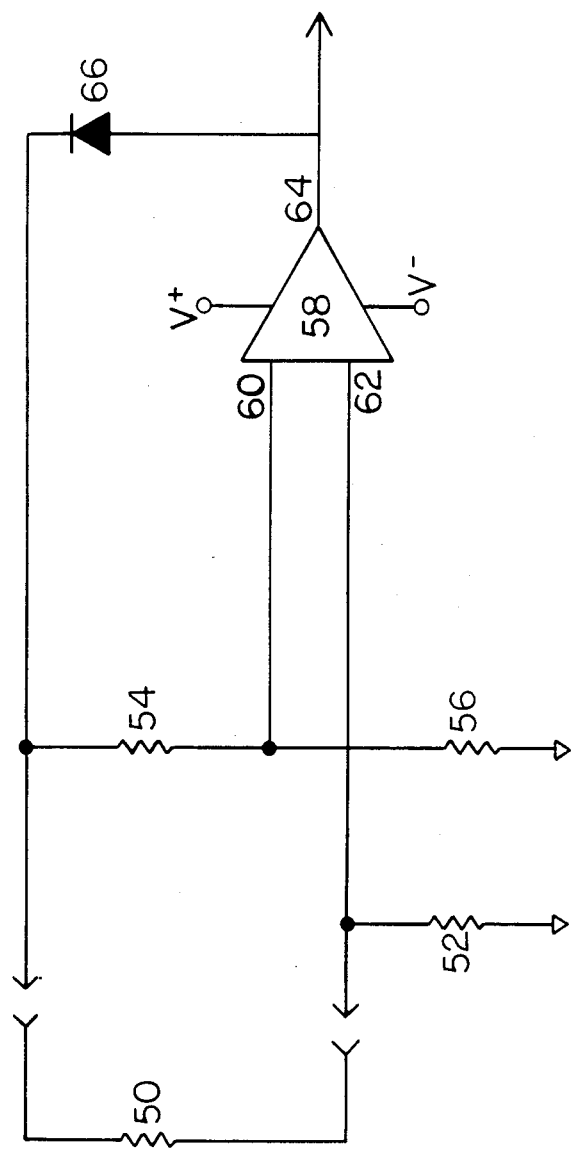
FIG. 2 shows the liquid detection circuit in detail.

Referring to FIG. 2 there is shown a schematic of block 51, of FIG. 1. Thermistor 50 electrically in series with resistor 52 forms a first voltage divider, the output of which is connected to input 62, the non-inverting input of amplifier 58. Resistor 52 is a reference resistor, which determines the operating temperature of the circuit as explained below.

Resistor 54 in series with resistor 56 forms a second voltage divider the output node of which is connected to input 60, the inverting input of amplifier 58. This second voltage divider is electrically parallel to the first voltage divider; the inputs of both dividers are connected to the output 64 of amplifier 58 via diode 66.

As configured, amplifier 58 operates as a differential voltage amplifier producing an output voltage proportional to the difference voltage between the two inputs, 60 and 62. When the voltage difference between the two inputs is zero, the output voltage of amplifier 58 will be zero. When the voltage difference between the two inputs is non-zero, the output voltage will be non-zero.

The gain of amplifier 58 as configured in FIG. 2, is never less than 1. By the formula for computing the voltage gain of a noninverting operational amplifier, those skilled in the art will realize that some amplification of the input voltage will always occur in this circuit. As the input signal is amplified, the output signal will increase producing again a larger input signal via the feedback path through diode 66. Conversly as the input signal decreases, the output signal will decrease. The liquid detector circuit as shown in FIG. 2 is thus "self-excited". This self-excited operation practically yields two stable states. Depending on the value of thermistor 50 with respect to resistor 52, amplifier 58 output voltage will be on or off. Depending on the temperature of thermistor 50, amplifier 58 will produce in output voltage that is high or low. Circuitry monitoring the output voltage of amplifier 58, such as circuitry in Block 12 of FIG. 1, detects the output state of amplifier 58.

Examining the circuit of FIG. 2 it can be seen that the input voltage difference between inputs 60 and 62, will be zero, and the output voltage of amplifier 58 will be zero, when both voltage dividers are equivalent. This will occur when the ratio of the resistance of thermistor 50 to resistor 52 equals the ratio of the resistance of resistor 54 to resistor 56. When both dividers are equivalent, the voltage at the inputs 60 and 62 will be equivalent.

Note that the output voltage of amplifier 58 will also be zero when the resistance of thermistor 50 exceeds the resistance of resistor 52. (This would occur if thermistor 50 is in a relatively "warm" liquid effectively causing thermistor 50 to exceed resistor 52.) When the noninverting input voltage of amplifier 58 is less than the inverting input voltage, the output voltage of amplifier 58 would normally go below zero volts. Diode 66 however, will block current flow into output terminal 64, preventing it from going negative. When the output 64 voltage tries to go negative, diode −66 will prevent current from flowing through the two voltage dividers into output terminal 64. Diode −66 as oriented in FIG. 2 therefore limits the output voltage of amplifier 58 to only positive values.

The output voltage of amplifier 58 will be non-zero when a difference voltage exists at the inputs 60 and 62. This will occur when the two voltage dividers referred to above are unequal. Since resistor 54 and 56 are of fixed value, (and for simplification of this discussion they are of equal value), a voltage difference between the two inputs will develop when thermistor 50 is not equal to resistor 52.

When the ratio of thermistor 50 to resistor 52, is less than the ratio of resistor 54 to 56, input 62 the noninverting input, will be at a higher voltage potential than input 60. Amplification of this voltage difference will take place producing a positive feedback signal to amplifier 58 which ultimately forces the output of amplifier 58 to saturate to the positive supply voltage. As long as thermistor 50 stays at a temperature at which its resistance is less than resistor 52, such as when it is immersed in cold liquid, the output of amplifier 58 will stay on.

If thermistor 50 is operated out of a cooling liquid, the circuit of FIG. 2 will protect the thermistor 50 from overheating by limiting the current through the thermister. With the output voltage on, current will flow through all the resistive components causing them to heat. With respect to thermistor 50, when it is out of a cooling liquid, or operated in a vacuum, its temperature and resistance will increase in response to the current flow until its resistance equals resistor 52 at which point the voltage dividers will be equal and the output of amplifier 58 will go to zero. The circuit of FIG. 2 therby limits current flow through thermistor 50 when it is not immersed in a liquid. By changing the value of the fixed value resistors, an appropriate temperature sensing element and an appropriate operational amplifier, the circuit can be used to detect the presence of any liquid of virtually any temperature.

In the tests of this invention, resistors 54 and 56 were chosen to be of equal value yielding a voltage gain of two for amplifier 58. A value of 10K-ohms was chosen for both resistors 54 and 56 to limit current drain on the output stage. Different values for and ratios of resistors 54 and 56 could be selected for these two resistors. The effect would be a larger or smaller voltage gain factor, which will decrease or increase respectively, the transition time of the output. Changing the voltage gain factor by changing resistors 54 and/or 56 would alter the rise/fall time of the output stage.

As mentioned, diode 66 limits the two possible stable output states of amplifier 58 to either on, (output stage saturated) or, the reference potential for the circuit, (ground or zero volts) by preventing output 64 from going negative. Amplifier 58 in the prototype embodiment operated with power supplies of +12 and −12 volts.

In the prototype embodiment, element 50 is an RTD type thermistor, chosen for having temperature coefficient of +0.39 ohms/° C. and being approximately 25 ohms at 77° K. Its power dissipation limits as set by the manufacturer, must be observed. Elements 54 and 56 are precision fixed value resistors, of 10K ohms. Resistor 52 determines the operating point of the circuit by being the value, in ohms, that thermister 50 must equal to effect operation of the circuit.

The mention of component values and component types herein is not to preclude selection of other component values and types. Those skilled in the art will realize that component values and numbers may be substituted to accomplish the desired results described above.

As configured in FIG. 2, amplifier 58 has two stable output states, on or off. Those skilled in the art will realize that the orientation of diode 66, and the topology of the voltage dividers with respect to the inputs of amplifier 58 could be changed to reverse the polarity of the "on" state of the amplifier.

Amplifier 58 is shown in FIG. 2 as being operated from positive and negative power supplies. Those skilled in the art will realize that the circuit might be operated from a single power supply as well.

The embodiments of this invention in which an exclusive property or privlege is claimed are defined as follows:

1. A circut for detecting the presence of a liquid in a vessel, said circuit having a temperature sensitive resistance sensing element wherein the temperature sensitive resistance sensing element is self-protected from over heating comprising:

a voltage amplifier means having an output and first and second inputs, said amplifier being responsive to a voltage difference between said amplifier inputs to produce a voltage at said amplifier output proportional to the voltage difference between said inputs;

a first voltage divider means having an input and an output, said output of said first voltage divider, coupled to said first input of said voltage amplifier means;

a temperature sensitive resistance means whose resistance varies with temperature;

a reference resistance means coupled in series with said temperature sensitive resistance means thereby forming a second voltage divider means having an input and an output, said second voltage divider means coupled in parallel with said first voltage divider means, said output of said second voltage divider coupled to said second input of said voltage amplifier means; said second voltage divider means having a voltage division factor proportional to the resistance of said temperature sensitive resistance;

means for continuously limiting the direction of current flow to a single direction coupled between said output of said voltage amplifier and the inputs of both said first and second voltage dividers such that a feedback signal to the inputs of said voltage dividers is produced by the output of said voltage amplifier, said reference resistance means and said temperature sensitive resistance means being of such resistance that with said temperature sensitive resistance at a resistance equal to or greater than said reference resistance, the output of said voltage amplifier means is at a reference potential for said circuit, such that the voltage division factor of said second voltage divider causes a reduction of the output of said voltage amplifier when the resistance said temperature sensitive resistance becomes less than said reference resistance whereby said temperature sensitive resistance is self-protected from overheating.

2. The circuit of claim 1 where said means for limiting the direction of current flow to a single direction is a diode.

3. The circuit of claim 2 where said first voltage divider means has a predetermined first voltage division factor.

4. The circuit of claim 3 where said reference resistance means is of a value such that the temperature dependent resistance means causes the voltage division factor of said second voltage divider means to be equal to said first voltage division factor when said temperature dependent resistance is at a predetermined temperature.

5. The circuit of claim 4 where said first voltage divider has a voltage division factor of one-half.

6. The circuit of claim 2 where said voltage amplifier means is an operational amplifier having inverting and noninverting inputs and an output.

7. The circuit of claim 3 where said temperature dependent resistance is a thermistor.

8. The circuit of claim 4 where said thermistor is an RTD type platinum sensing thermistor.

* * * * *